M. A. PAHLER.
CAR BRAKE.
APPLICATION FILED JAN. 27, 1910.
976,595.
Patented Nov. 22, 1910.
2 SHEETS—SHEET 1.
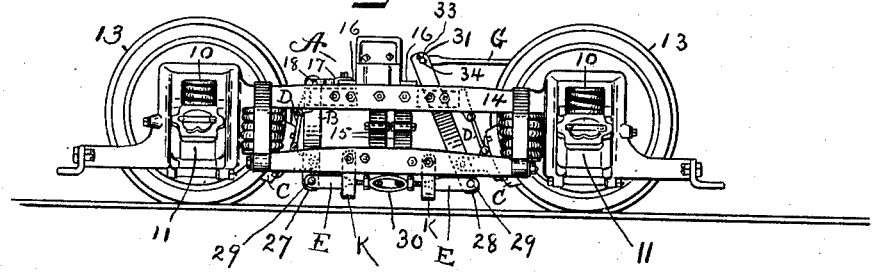
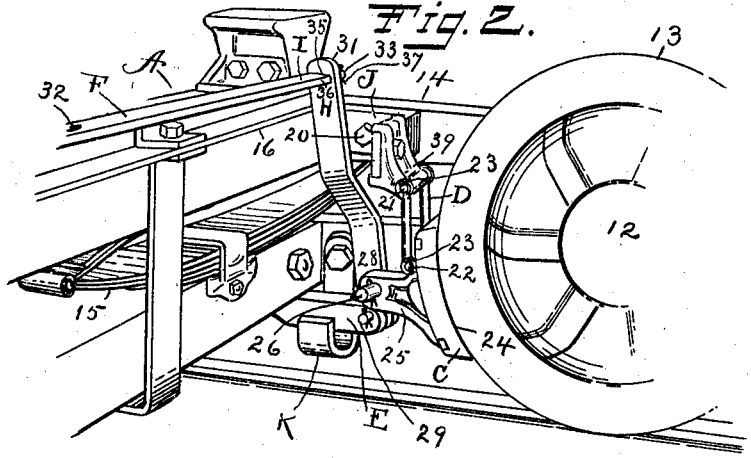
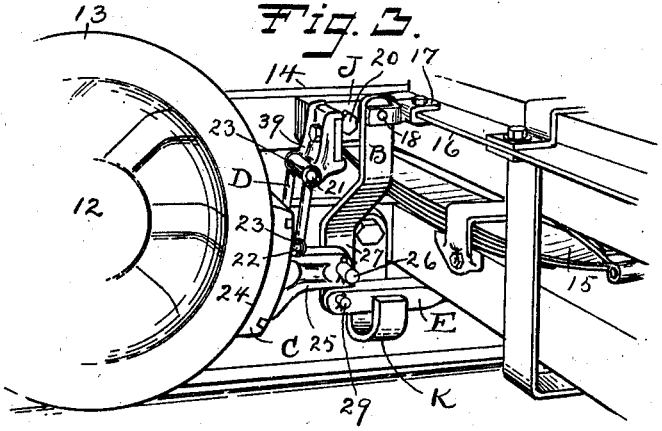
Witnesses:
S. H. Clarke
N. L. Lockwood
Inventor
Martin A. Pahler.
By Louis M. Schmidt
Atty

M. A. PAHLER.
CAR BRAKE.
APPLICATION FILED JAN. 27, 1910.

976,595.

Patented Nov. 22, 1910.

2 SHEETS—SHEET 2.

Witnesses:
S. H. Clarke
N. L. Lockwood

Inventor
Martin A. Pahler
By Louis M. Schmidt
Atty.

UNITED STATES PATENT OFFICE.

MARTIN A. PAHLER, OF HARTFORD, CONNECTICUT.

CAR-BRAKE.

976,595.  Specification of Letters Patent.  Patented Nov. 22, 1910.

Application filed January 27, 1910. Serial No. 540,340.

*To all whom it may concern:*

Be it known that I, MARTIN A. PAHLER, a citizen of the United States, residing at New Britain, in the county of Hartford and State of Connecticut, have invented certain new and useful Improvements in Car-Brakes, of which the following is a specification.

My invention relates to improvements in car brakes and the objects of my improvements are simplicity and economy in construction and convenience and efficiency in use.

Figure 4:
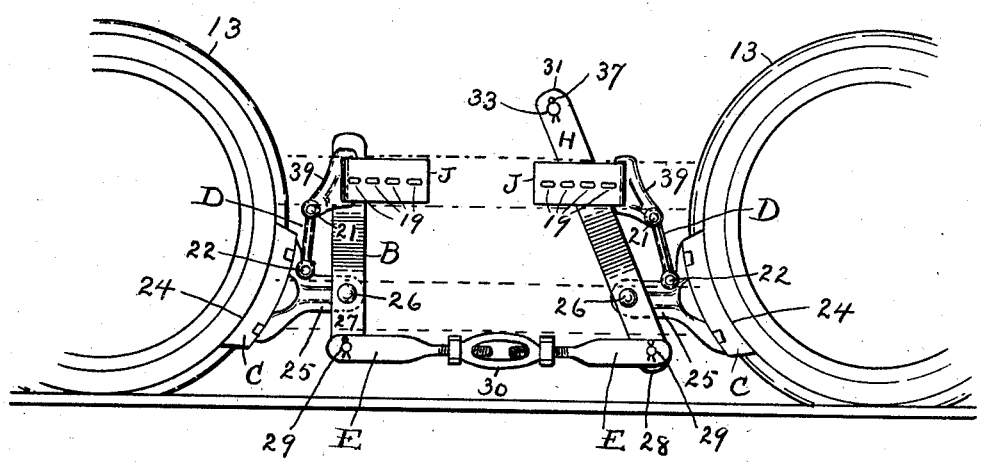
Figure 5:
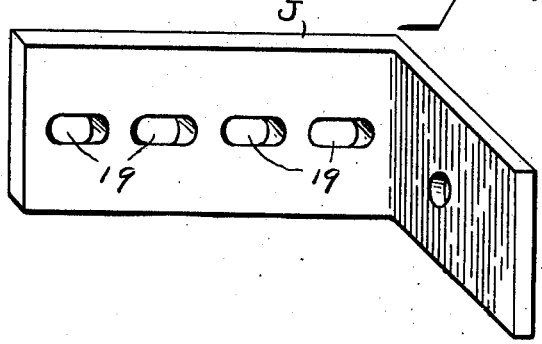

In the accompanying drawings:—Figure 1 is a side elevation of a car truck and my improved brake. Fig. 2 is a perspective view on an enlarged scale of a part of the same. Fig. 3 is a similar view of another part. Fig. 4 is a side elevation of my brake and truck wheels, the truck being omitted. Fig. 5 is a perspective view on an enlarged scale of my lower bracket.

A is the body of a car truck which through springs 10 is supported on journals 11 mounted on the axles 12 which in turn are supported by the wheels 13 in the usual manner, the said body comprising on each side a side frame 14, generally horizontal, outside of the wheels 13 and above the axles 12, and provided with means for supporting elliptical springs 15 through which the car body is supported. The said side frames are cross connected by transoms 16 extending across the top adjacent the central line. Mounted on the rear transom in a rigid manner is a pair of top brackets 17, essentially in line with the wheels 13, extending upwardly and rearwardly and provided with a pivotal bearing for a pin 18 which supports by its upper end and in a pendent position a dead lever B. To the inner face of each of the side frames 14 are attached a set of four lower brackets J, the said brackets being provided on the side adjacent the said side frames with a series of elongated holes or slots 19 adapted to receive clamping bolts 20. Shoe supports 39 are rigidly clamped to an inwardly projecting and overhanging arm on the said lower brackets J, and inclined downwardly from the said arm.

The bracket shoes C are hung from the lower ends of said shoe supports 39 by means of links D which are pivotally connected by their upper ends by means of pins 21 to said lower ends and are pivotally connected at their lower ends by pins 22 to the said shoes C, the said pins being held in place laterally by cotter pins 23. The said shoes C have the usual arc shaped friction surface 24 adapted to engage with the wheel surface, which as shown is adapted to engage with the lower wheel surface on the inner side of the wheel or the side toward the middle of the truck. On the side of the said pivotal support 22 remote from the said friction surface 24 the said shoe is provided with an inwardly directed arm 25 having at the inner end a pivot hole adapted to receive a pivotal pin 26. The rear shoes C are pivotally attached by the said pins 26 to the said dead lever B adjacent the lower ends 27. The pivotal pin 26 in the front shoes C serves as a pivotal support for a live lever H adjacent the lower end 28, the said lever generally extending upwardly above the said side frames 14.

On each side the lower end 27 of the dead lever B and the lower end 28 of the live lever H are adjustably cross connected by a tie rod E, the ends of which are pivotally mounted on pins 29 provided in said lower ends, the said rod being provided with means of adjustment of the length comprising a turn buckle 30. The upper ends 31 of said live levers H are cross connected by a horizontal lever F. The said horizontal lever comprises a flat bar I having at the center a hole 32 adapted for pivotal connection for a brake rod G and having the ends 33 drawn down to a circular form adapted to be received in bearing holes 34 in said live levers and retained laterally in position by shoulders 35 at the junction of the said circular bearing and the rectangular body portion 36. Cotter pins 37 may be provided in the extreme ends outside of the said live levers H.

Normally when in disengaged position the brake shoes C hang in pendent position by means of the links D, the line of support being such that the said shoes fall or swing away from the wheels 13 and toward one another, the tie rod E in combination with the pivotal connections of the dead lever B and the live lever H insuring the concentricity of the said friction surface 24. At the same time the said upper ends 31 of the live levers H, the flat bar I attached thereto and the brake rod G attached to the said flat bar I are located in their extreme backward positions. By means of the said turn buckle 30 the position of the shoes C in such normal positions may be so adjusted as to be close to the said wheel 13, so that a moderate forward movement of the said brake rod G will serve to bring the said friction surface 24 in braking engagement with the said wheels 13, and a braking pull applied to the said rod G is transmitted essentially direct to the wheels. Upon relaxing the pull on rod G the release is essentially instantaneous and automatic, the brake shoes C falling away to the normal disengaged position described on account of the weights of the interconnected parts.

K is a safety hook under the ends of the tie rod E, adapted to support the same in case of intentional or accidental disengagement of supporting members.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

1. A car brake in combination with a car truck comprising on each side a set of brake shoes inwardly hung, the said shoes pivotally supported in a pendent position, a dead lever pivotally supported by its upper end and attached near its lower end to one shoe, a live lever attached to the other shoe, the said shoes free from other connections, the said levers interconnected at the lower ends by a tie rod, the said live levers arranged so as to be each inwardly receding from its lower end toward its upper end and of such length as to overhang the truck body adjacent the central line of the truck, and the said live levers cross connected at their upper ends by an operating bar, the connection of the said levers and bar comprising a rocking connection, the said bar provided with shoulders limiting the separation of the said levers, and the said bar straight and located adjacent the central line of the truck, and a brake rod connected by an essentially fixed pivotal connection to the center of the said bar.

2. In a car brake in combination with a car truck comprising side frames, the said car brake comprising front and rear brake shoes, dead levers connected to the rear shoes, live levers connected to the front shoes, the live lever and dead lever on each side connected by a tie rod, the said brake shoes supported in a pendent position and interconnected with said levers, the means of support for said brake shoes comprising links pivotally supported by their upper ends from brackets, the said brackets secured to said side frames by clamping bolts, and provided with elongated receiving holes for said clamping bolts.

MARTIN A. PAHLER.

Witnesses:
SHEFFIELD H. CLARKE,
NEWTON L. LOCKWOOD.